(12) United States Patent
Lee et al.

(10) Patent No.: US 10,458,303 B2
(45) Date of Patent: Oct. 29, 2019

(54) UREA PUMP MODULE FOR VEHICLE

(71) Applicants: Hyundai Motor Company, Seoul (KR); Kia Motors Corporation, Seoul (KR); Hyundam Industrial Co., Ltd., Asan, Chungcheongnam-do (KR)

(72) Inventors: Sung Won Lee, Gyeonggi-do (KR); Seung Hoon Choi, Seoul (KR); June Young Park, Gyeonggi-do (KR); Tae Yoon Lee, Seoul (KR); Jun Sik Lim, Gyeonggi-do (KR); Yong Taek Hwang, Chungcheongnam-do (KR); Chan Yo Jeon, Chungcheongnam-do (KR)

(73) Assignees: Hyundai Motor Company, Seoul (KR); Kia Motors Corporation, Seoul (KR); Hyundam Industrial Co., Ltd., Asan, Chungcheongnam-do (KR)

( * ) Notice: Subject to any disclaimer, the term of this patent is extended or adjusted under 35 U.S.C. 154(b) by 142 days.

(21) Appl. No.: 15/829,939

(22) Filed: Dec. 3, 2017

(65) Prior Publication Data

US 2019/0112954 A1    Apr. 18, 2019

(30) Foreign Application Priority Data

Oct. 18, 2017 (KR) .................. 10-2017-0134944

(51) Int. Cl.
*F01N 13/00* (2010.01)
*F01N 3/20* (2006.01)

(52) U.S. Cl.
CPC .......... *F01N 3/208* (2013.01); *F01N 3/2066* (2013.01); *F01N 2610/02* (2013.01);
(Continued)

(58) Field of Classification Search
CPC ............. F01N 2610/02; F01N 2610/10; F01N 2610/1433; F01N 2610/144;
(Continued)

(56) References Cited

U.S. PATENT DOCUMENTS

| | | | |
|---|---|---|---|
| 2010/0107615 A1* | 5/2010 | Chmielewski | F01N 3/2066 60/303 |
| 2012/0224991 A1* | 9/2012 | Lipinski | F04C 2/084 418/166 |

(Continued)

FOREIGN PATENT DOCUMENTS

| | | |
|---|---|---|
| JP | 5206201 | 6/2013 |
| KR | 10-1326838 | 11/2013 |

(Continued)

*Primary Examiner* — Jonathan R Matthias
(74) *Attorney, Agent, or Firm* — Mintz Levin Cohn Ferris Glovsky and Popeo, P.C.; Peter F. Corless

(57) ABSTRACT

A vehicular urea pump module includes a structure capable of preventing urea from permeating into electrical elements such as a pump, a heater, and a sensor of the urea pump module; a structure capable of easily defrosting frozen urea; a structure of separating foreign substances; a structure of reducing vibration noise; a structure of enabling the discharge and suction of urea using a single pump; and a structure of increasing the efficiency of assembly for ease of assembly of respective elements.

14 Claims, 15 Drawing Sheets

(52) U.S. Cl.
CPC .... *F01N 2610/10* (2013.01); *F01N 2610/144* (2013.01); *F01N 2610/1406* (2013.01); *F01N 2610/1426* (2013.01); *F01N 2610/1433* (2013.01); *F01N 2610/1493* (2013.01)

(58) Field of Classification Search
CPC .......... F01N 2610/1486; F04C 15/0096; F04C 2210/1083; F04D 13/086; F04D 29/588
See application file for complete search history.

(56) References Cited

U.S. PATENT DOCUMENTS

| | | | | |
|---|---|---|---|---|
| 2013/0108484 A1* | 5/2013 | Ryoo | ................... | F01C 19/005 417/410.1 |
| 2015/0050168 A1* | 2/2015 | Ryu | ................. | F04D 13/06 417/410.1 |

FOREIGN PATENT DOCUMENTS

| | | |
|---|---|---|
| KR | 10-1459476 | 11/2014 |
| KR | 10-1490931 | 2/2015 |
| KR | 10-1647959 | 8/2016 |
| KR | 10-1655201 | 9/2016 |

* cited by examiner

FIG. 3
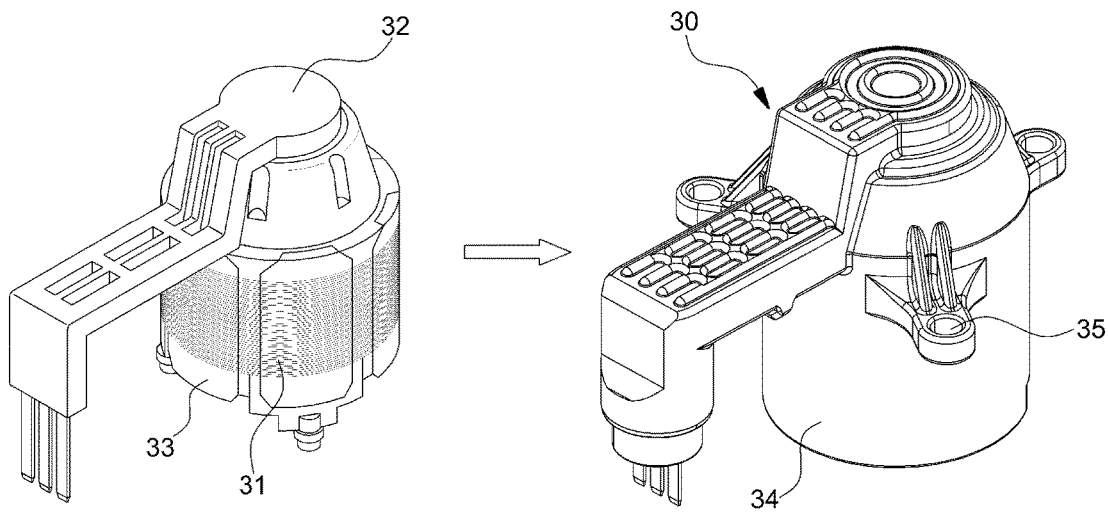
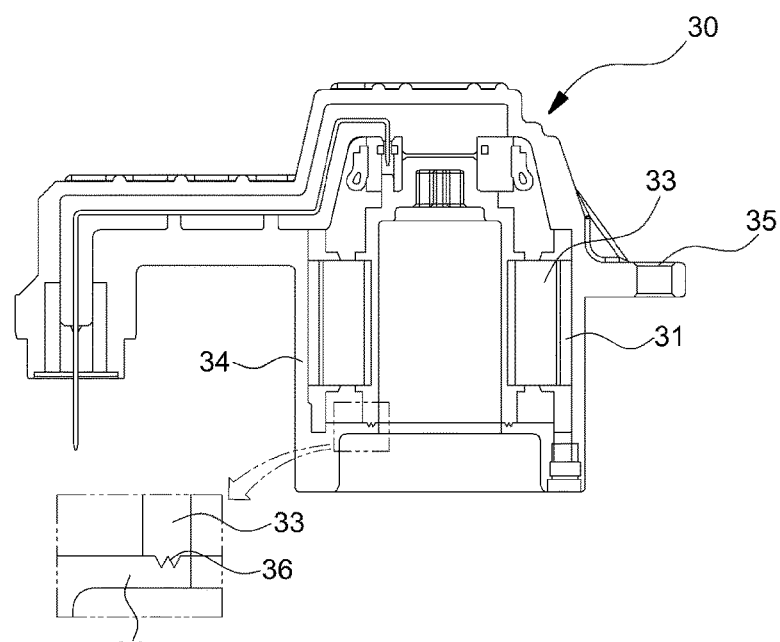
FIG. 4

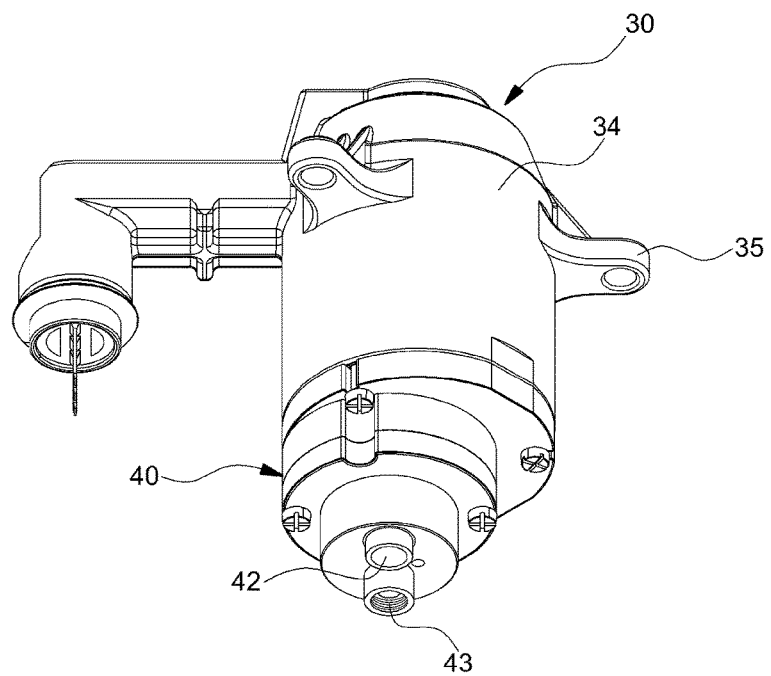
FIG. 6B
FIG. 7
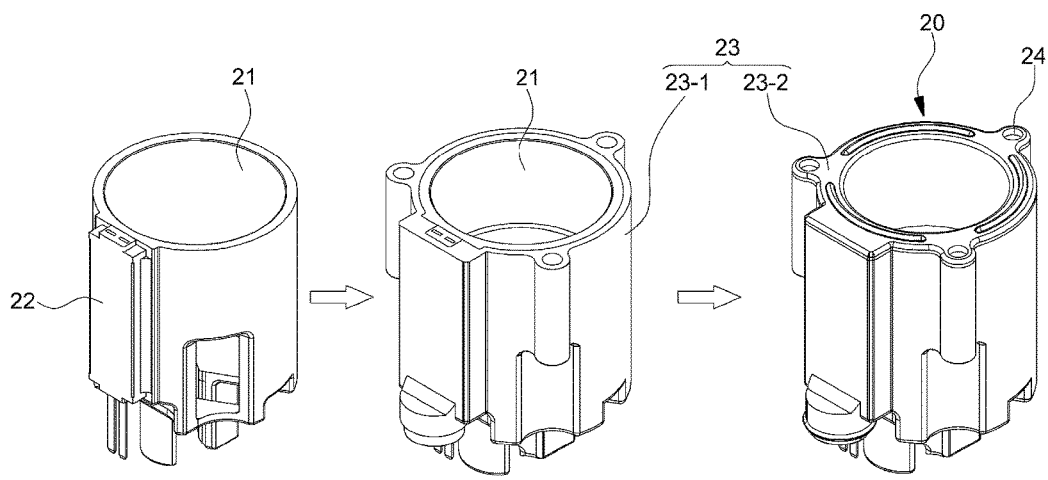

FIG. 14 ⟶ : UREA

UREA PUMP MODULE FOR VEHICLE

CROSS-REFERENCE TO RELATED APPLICATION

This application claims under 35 U.S.C. § 119(a) the benefit of Korean Patent Application No. 10-2017-0134944 filed on Oct. 18, 2017, the entire contents of which are incorporated herein by reference.

BACKGROUND

(a) Technical Field

The present disclosure relates to a vehicular urea pump module, and more particularly, to a vehicular urea pump module configured to supply urea to a selective catalytic reduction (SCR) system of a diesel vehicle.

(b) Description of the Related Art

An exhaust system of a diesel engine vehicle is equipped with a selective catalytic reduction (SCR) system, which sprays urea to an exhaust pipe in order to effectively remove nitrogen oxides.

To this end, in addition to a diesel fuel tank filled with diesel fuel, the diesel engine vehicle (more particularly, a commercial vehicle) is equipped, as illustrated in FIG. 18 (RELATED ART), with a urea tank 1, which is filled with urea, and a urea pump module 2 is mounted in the urea tank 1 to pump urea so as to supply the urea to the SCR system.

Thus, when the urea in the urea tank 1 is supplied to a urea dosing module 3, which is an injector mounted in the inlet of an SCR catalyst 4, via pumping of the pump module 2, the urea dosing module 3 sprays urea to the SCR catalyst 4 so as to reduce the amount of NOx.

At this time, the urea sprayed toward the SCR catalyst 4 is dissolved into multiple ammonia molecules by exhaust heat to react with a nitrogen oxide (NOx) in the exhaust gas, and harmless nitrogen ($N_2$) and water ($H_2O$), as reaction products, are discharged outward.

As described above, the urea pump module applied to the SCR system is designed and manufactured to supply a required amount of urea at a constant pressure from the urea tank to the urea dosing module 3 as an injector and to collect the urea when the ignition is off in order to prevent a urea line from freezing.

In addition, the urea pump module is designed and manufactured to have, for example, a heating function of defrosting urea when the urea inside the urea tank is frozen so as to supply the urea normally, a level sensing function of sensing a remaining amount of urea inside the urea tank and transmitting the sensed result to a controller, a temperature sensing function of sensing the temperature inside the urea tank and transmitting the sensed result to the controller, a filtering function of removing foreign substances included in urea, and a urea concentration sensing function of detecting an invalid urea concentration when the urea is introduced.

However, a conventional urea pump module such as that described above with reference to FIG. 18 has the following problems.

First, due to, for example, the generation of cracks caused by deterioration in the strength of a casing of the urea pump, the urea may permeate into a pump drive unit (e.g., a stator and a rotor of a motor), a circuit element of a heater for the prevention of urea freezing, and various sensors, causing damage to the urea pump and consequently stopping operation.

Second, the urea may not be well defrosted in winter due to inadequacy of the performance of the heater for the prevention of urea freezing, which results in an increase in the amount of exhaust gas (NOx).

That is, the SCR system is characterized by indefinite urea spray timing and spray amount, which results in an increase in the amount of exhaust gas (NOx) due to pulsation.

Moreover, when the urea is not well defrosted due to inadequacy of the performance of the heater for the prevention of urea freezing, damage to a product may occur in a urea flow line of the entire pump module.

Third, when the urea permeates into a urea concentration sensor, which is an ultrasonic sensor, the precision of sensing of the urea concentration sensor, i.e., the precision of a level output by the reflection of received waves may be deteriorated.

Fourth, a motor may be damaged due to shocks by magnetic force when the rotor constituting the motor of the urea pump module is assembled.

Fifth, the conventional urea pump module includes a total of two pumps, namely a urea supply pump and a urea collection pump, which results in a complicated pump module structure and increased manufacturing costs.

In addition, in the conventional urea pump module, due to deterioration in the function of filtering foreign substances in the urea, the foreign substances are concentrated on a specific region of a urea flow path, causing deterioration in the durability and lifespan of the urea pump module, and major elements of the urea pump module are assembled via thermal fusion, which results in deterioration in productivity and an increased defective proportion.

SUMMARY

An object of the present disclosure is to provide a vehicular urea pump module which is configured to have, for example, a structure capable of preventing urea from permeating into electrical elements such as a pump, a heater, and a sensor of the urea pump module, a structure capable of easily defrosting frozen urea, a structure of separating foreign substances, a structure of reducing vibration noise, a structure of enabling the discharge and suction of urea using a single pump, and a structure of increasing the efficiency of assembly for ease of assembly of respective elements.

In one aspect, a vehicular urea pump module includes: a case including a separation plate having a urea discharge port and a plurality of pipes formed in an upper surface thereof, and upper and lower protective plates integrally formed on upper and lower surface rims of the separation plate respectively; a cylindrical heater including a first sealing material molded over a surface of a cylindrical heat sink coupled with a positive temperature coefficient (PTC) element, the heater having a first fastening hole formed in an outer-diameter portion thereof, into which each pipe is inserted and fastened; a motor including a second sealing material molded over a surface of a hollow stator having a coil wound around an outer-diameter portion thereof and a terminal assembled to a top thereof, the motor having a second fastening hole formed in the outer-diameter portion so that a tip end portion of the pipe, which has passed through the first fastening hole, is inserted into and fastened to the second fastening hole; and a pump including a rotor rotatably mounted on a top thereof so as to be inserted into the hollow stator of the motor, a suction port and a discharge port formed in a bottom portion thereof, and a pair of gears rotatably mounted therein so as to rotate forwards or in reverse, wherein, in a state in which the motor and the pump are inserted and disposed in a hollow portion of the heater, heat of the heater is transferred to the motor and the pump and also transferred to urea inside a urea tank.

In a preferred embodiment, the separation plate of the case may have a lower surface to which a circuit board is attached to process signals from a urea capacity detection level sensor and an invalid urea concentration detection sensor, and the lower protective plate may have a connector for input/output of the circuit board and a urea support port communicating with the urea discharge port.

In another preferred embodiment, the lower protective plate may be fused to a sealing cover that seals electronic elements on a lower surface of the separation plate and inside the lower protective plate, and the sealing cover may have a check-valve-type air vent formed therein.

In still another preferred embodiment, the first sealing material may include a first molding portion primarily over-molded on a portion of an inner-diameter surface and an outer-diameter surface of the cylindrical heat sink coupled with the PTC element and a second molding portion secondarily over-molded on an upper surface and a remaining inner-diameter surface of the heat sink, and the first molding portion and the second molding portion may have therebetween a contact surface provided with a serration structure.

In yet another preferred embodiment, the second sealing material and a lower surface of the hollow stator may have therebetween a contact surface provided with a serration structure.

In still yet another preferred embodiment, the pump may include a third sealing material molded over a surface of the rotor thereof, and an E-ring may be fastened to an upper end of a rotating shaft exposed from an upper surface of the rotor to prevent separation of the rotor.

In a further preferred embodiment, the gears may have a bypass line formed in a rotation center thereof so as to communicate with an inside of the urea tank, the bypass line serving as a path to remove a remaining high pressure when the gears mounted in the pump rotate forwards or in reverse.

In another further preferred embodiment, the filter assembly may include a housing having an outer-diameter portion that is opened so as to communicate with the urea inlet port formed in the upper protective plate, the housing being formed to have a top opening structure for filter assembly and being seated onto and assembled with a side portion of the upper surface of the separation plate, a filter formed on a bottom of the housing via insert injection molding, an upper cover closely assembled to a top opening in the housing to cover the filter, and a suction pipe configured to protrude from an inner-diameter portion of the housing so as to communicate with a space inside the housing after filtering of the filter, the suction pipe being connected to the suction port in the pump.

In still another further preferred embodiment, a urea capacity detection level sensor and an invalid urea concentration detection sensor may be mounted on the upper surface of the separation plate at independent positions in such a manner that the urea capacity detection level sensor is mounted to transmit and receive ultrasonic waves in a vertical direction and the invalid urea concentration detection sensor is mounted to transmit and receive ultrasonic waves in a horizontal direction.

In yet another further preferred embodiment, the urea capacity detection level sensor may include a cylindrical guide configured to guide transmission and reception of vertical ultrasonic waves, and the invalid urea concentration detection sensor may include an ultrasonic wave emitter and a reflector, which horizontally face each other on the separation plate.

In still yet another further preferred embodiment, the first sealing material molded on a surface of the heater and the second sealing material molded on a surface of the motor may include a plurality of ribs, having a round cross section, formed on upper surfaces thereof to prevent reflection of the ultrasonic waves that have been emitted from the urea capacity detection level sensor and reflected from a urea flow plane.

In a still further preferred embodiment, the pump may include a first rubber having a ring shape and attached to a lower surface thereof, which is in contact with the upper surface of the separation plate, to absorb vibrations, and a second rubber may be attached to a contact portion between an upper surface of the cylindrical heater and the motor upon assembly thereof.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 3 is a perspective view illustrating a motor assembly process of the vehicular urea pump module according to the present disclosure;

FIG. 4 is a cross-sectional view illustrating the motor assembly state of the vehicular urea pump module according to the present disclosure;

FIGS. 6A and 6B are perspective views illustrating the mutually assembled state of a motor and a pump of the vehicular urea pump module according to the present disclosure;

FIG. 7 is a perspective view illustrating a heater assembly process of the vehicular urea pump module according to the present disclosure;

Figure 1:
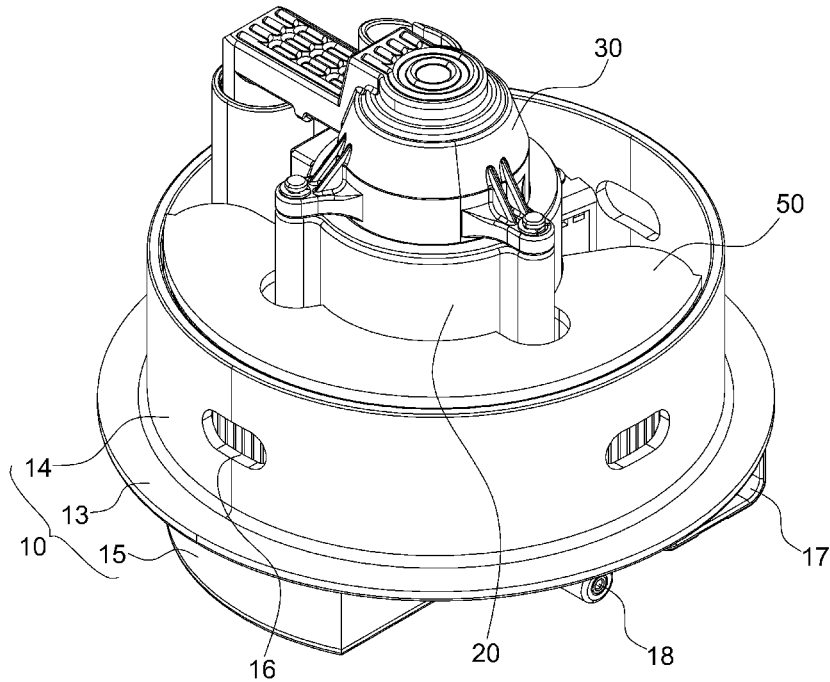
FIG. 1 is a top perspective view illustrating a vehicular urea pump module according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the exemplary embodiments of the present disclosure will be described in detail with reference to the accompanying drawings.

Figure 2:
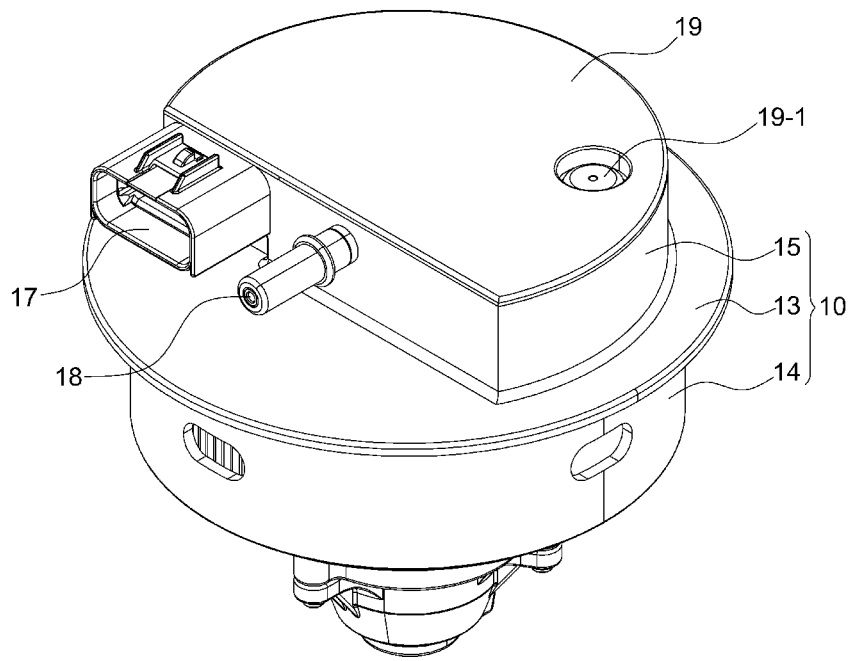
FIG. 2 is a bottom perspective view illustrating the vehicular urea pump module according to the present disclosure.

FIG. 1 is a top perspective view illustrating a vehicular urea pump module according to the present disclosure, and FIG. 2 is a bottom perspective view illustrating the vehicular urea pump module according to the present disclosure.

In FIGS. 1 and 2, reference numeral 10 indicates a plastic case.

The case 10 includes a separation plate 13 having a urea discharge port 11 and a plurality of pipes 12 formed in the upper surface thereof and upper and lower protective plates 14 and 15 integrally formed on the upper and lower surface rims of the separation plate 13 respectively.

The upper surface of the separation plate 13 and the upper protective plate 15 provide the space in which a heater 20, a pump 40 assembled with a motor 30, and a filter assembly 50 may be sequentially assembled.

In particular, when the case 10 is injection-molded in a mold, stainless-steel (SUS) pipes may be inserted into the mold so that the pipes 12 are integrally formed with the separation plate 13 of the case 10 so as to protrude therefrom.

In addition, the upper protective plate 14 of the case 10 has a urea inlet port 16 formed therein to guide urea toward a filter so as to enable the filtering of the urea.

In addition, a circuit board is attached to the lower surface of the separation plate 13 to process signals of a urea capacity detection level sensor and an invalid urea concentration detection sensor, and the lower protective plate 15 is provided with a connector 17 for the input/output of the circuit board and a urea supply port 18, which communicates with the urea discharge port 11.

In addition, a sealing cover 19 is fused to the lower protective plate 15 to hermetically seal, for example, various circuit boards and electronic elements on the lower surface of the separation plate 13 and inside the lower protective plate 15. The sealing cover 19 has a check-valve-type air vent 19-1 for the prevention of dew condensation.

The heater 20 is a heater that uses a positive temperature coefficient (PTC) element, and, as illustrated in FIG. 7, has a framework in which a PTC element 22 is coupled to the outer-diameter portion of a cylindrical heat sink 21.

In particular, a first sealing material 23 is molded over the surface of the cylindrical heat sink 21. Upon molding of the first sealing material 23, a first fastening hole 24, into which the pipe 12 is inserted and fastened, is vertically formed in the outer-diameter portion of the heat sink 21.

Figure 8:
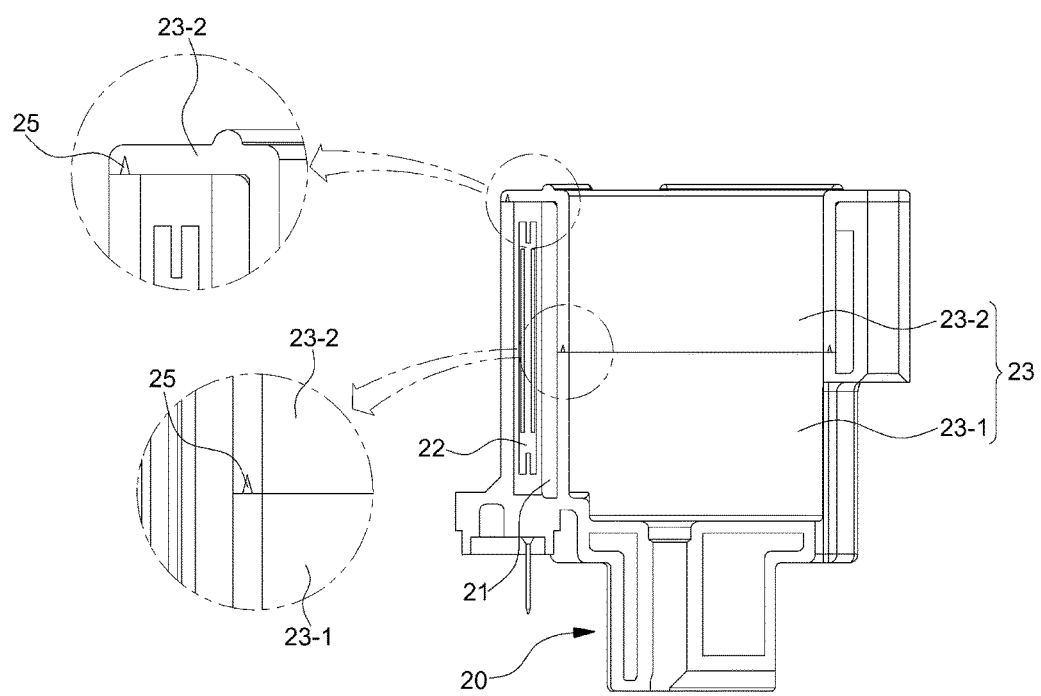
FIG. 8 is a cross-sectional view illustrating the heater assembly state of the vehicular urea pump module according to the present disclosure.

In particular, as illustrated in FIG. 8, the first sealing material 23 includes a first molding portion 23-1, which is primarily over-molded on a portion of the inner-diameter surface and the outer-diameter surface of the cylindrical heat sink 21, which has been coupled to the PTC element 22, and a second molding portion 23-2, which is secondarily overmolded on the upper surface and the remaining inner-diameter surface of the heat sink 21.

As such, the first sealing material 23 of the heater 20 is in contact with the urea inside the urea tank, thereby preventing the urea from permeating into the heater 20.

The contact surface between the first molding portion 23-1 and the second molding portion 23-2 may be provided with a serration structure 25 in order to increase the water-tightness with respect to urea, which may further prevent the urea from permeating into the heat sink 21 and the PTC element 22.

Referring to FIGS. 3 and 4, the motor 30 is a pump drive unit and includes, as a framework, a hollow stator 33 having a coil 31 wound around the outer-diameter portion thereof and a terminal 32 assembled to the top thereof, and a second sealing material 34 is molded over the surface of the stator 33 including the coil 31 and the terminal 32.

In particular, upon molding of the second sealing material 34, a second fastening hole 35 is formed in the outer-diameter portion of the stator 33 so that the tip end portion of the pipe 12, which has passed through the first fastening hole 24 in the heater 20, is inserted into and fastened to the second fastening hole 35.

Similarly, the contact surface between the second sealing material 34 and the lower surface of the hollow stator 33 may be provided with a serration structure 36 in order to maximize the performance of water-tightness.

As such, the second sealing material 34 of the motor 30 is in contact with the urea inside the urea tank, thereby preventing the urea from permeating into the motor 30.

Figure 5:
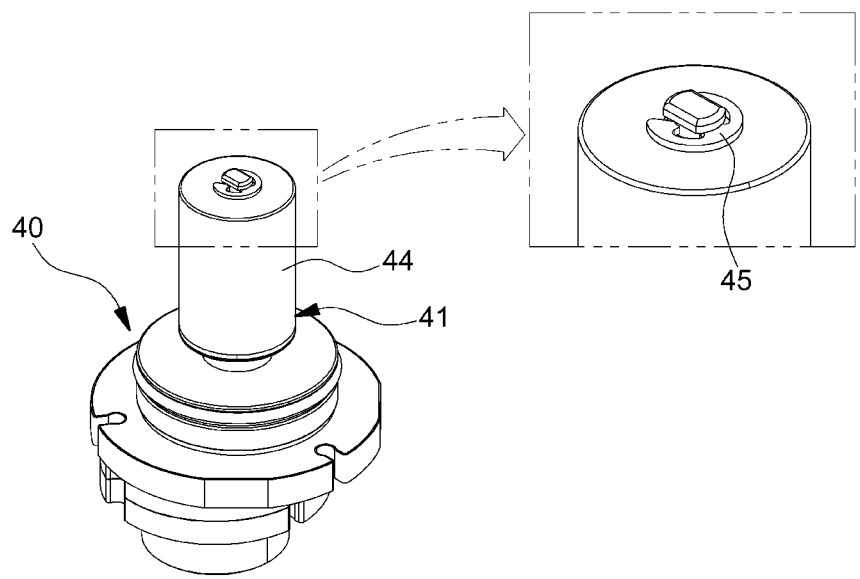
FIG. 5 is a perspective view illustrating the pump assembly state of the vehicular urea pump module according to the present disclosure.
Figure 6A:
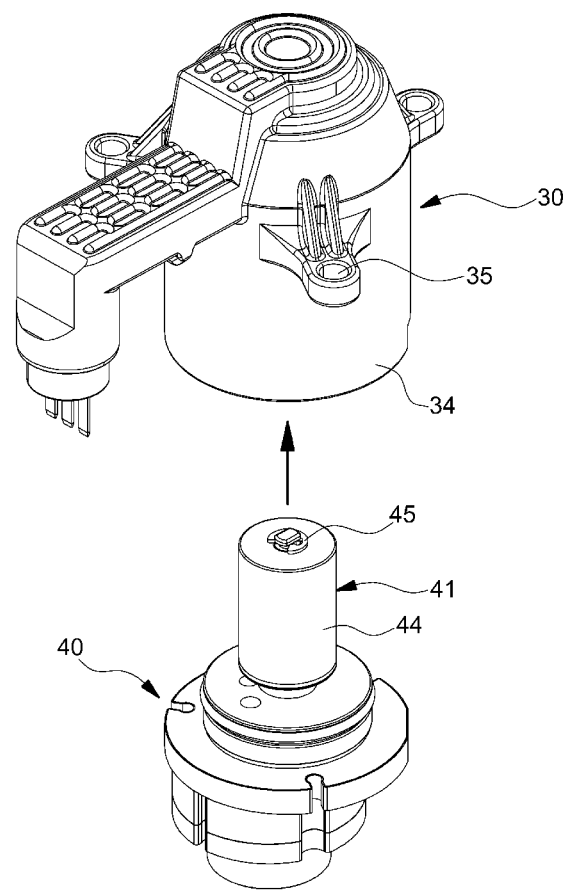

Referring to FIGS. 5, 6A and 6B, the pump 40 serves to pump the urea via motor driving after it is inserted into and coupled to the stator 33 of the motor 30. The pump 40 includes a rotor 41 rotatably mounted on the top thereof so as to be inserted into the hollow stator 33 of the motor 30, and has a suction port 42 and a discharge port 43 formed in the bottom portion thereof. A pair of gears is mounted in the pump 40 so as to rotate forwards or in reverse.

At this time, since the rotor 41 may rotatably protrude upward from the case of the pump 40 and may be exposed to the urea inside the urea tank, a third sealing material 44 may be molded over the surface of the rotor 41 to prevent the direct contact between the rotor 41 and the urea.

In addition, a rotor-separation-preventing E-ring 45 may be fastened to the upper end of a rotating shaft that is exposed from the upper surface of the rotor 41, which may prevent separation of the rotor 41 upon assembly and interference between the rotor 41 and the inner-diameter of the stator 33.

In addition, the suction port 42 formed in the bottom portion of the pump 40 is connected to a suction pipe 54 of a filter assembly 50, which will be described below, and the discharge port 43 is connected to the urea discharge port 11 of the separation plate 13.

Figure 11:
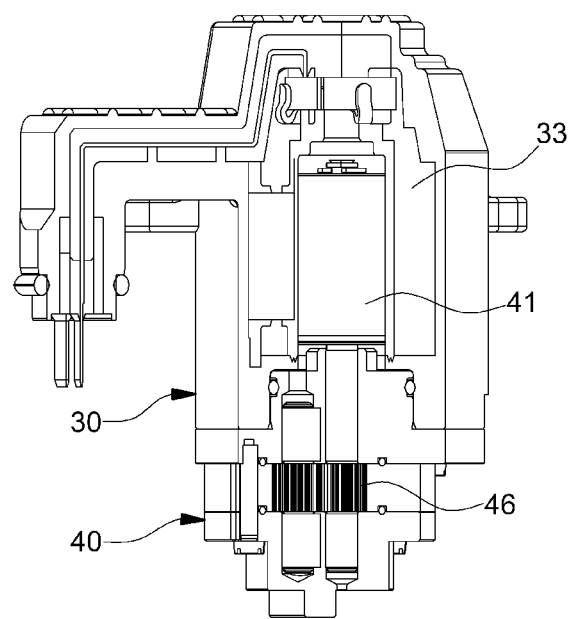
FIG. 11 is a cross-sectional view illustrating the interior structure in the assembled state of the motor and the pump of the vehicular urea pump module according to the present disclosure.
Figure 12:
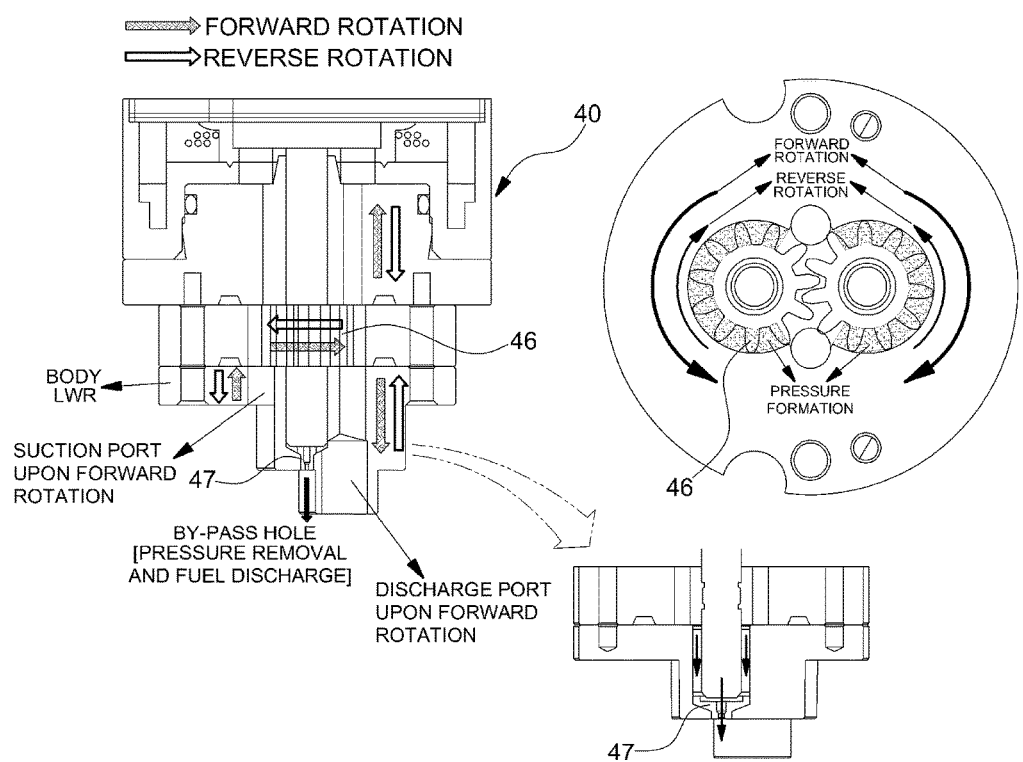
FIG. 12 is a cross-sectional view illustrating the pump operation flow of the vehicular urea pump module according to the present disclosure.

Referring to FIGS. 11 and 12, the pump 40 is a gear-type pump in which a pair of gears 46 may be mounted so as to rotate forwards or in reverse. As the gears 46 rotate forwards or in reverse, the supply or collection of the urea may be performed.

In addition, in order to achieve smooth rotation of the gears 46 by removing remaining high pressure when the gears 46 mounted in the pump 40 rotate forwards or in reverse, that is, in order to maintain the constant interior pressure of the pump 40 so as to reduce pulsation in the closed state of an urea-dosing module, which is an injector to spray urea to an SCR catalyst, a bypass line 47 is formed in the rotation center of the gears 46 to discharge the urea remaining in the pump to the urea tank.

Figure 9:
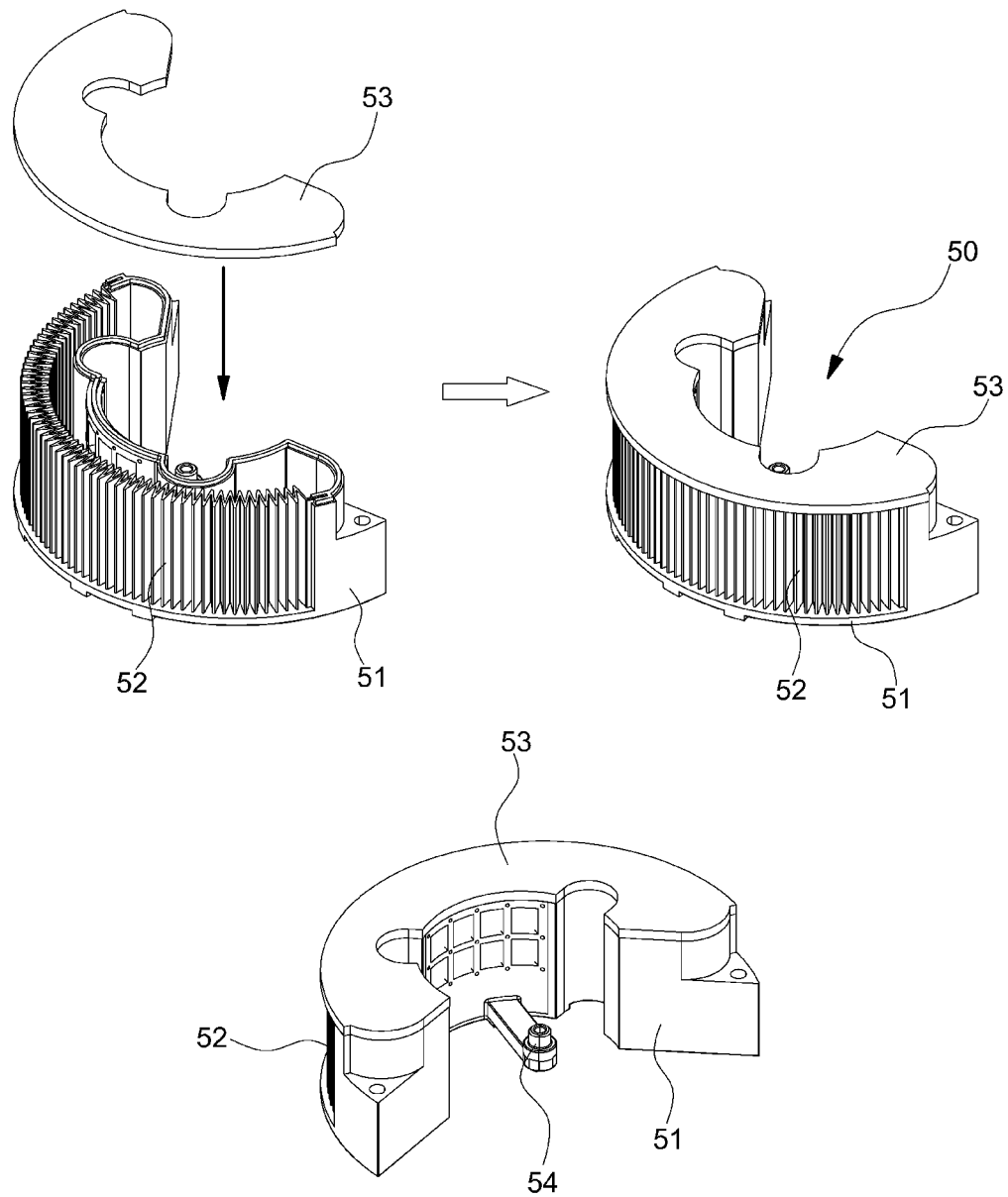
FIG. 9 is a perspective view illustrating a filter assembly process of the vehicular urea pump module according to the present disclosure.

Referring to FIG. 9, the filter assembly 50 serves to filter foreign substances before the urea inside the urea tank is introduced into the pump 40, and is mounted in the space between the inner diameter of the upper protective plate 14 and the outer diameter of the heater 20 so as to filter the urea, which is introduced in a horizontal flow form through the urea inlet port 16 formed in the upper protective plate 14 and to guide the urea to the pump 40.

To this end, the outer-diameter portion of the filter assembly 50 is opened so as to communicate with the urea inlet port 16 formed in the upper protective plate 14, and includes, as a framework, a housing 51, which has a top opening structure for filter assembly and is seated onto and assembled with a side portion of the upper surface of the separation plate 13.

In addition, a filter 52 is formed on the bottom of the housing 51 via insert injection molding in order to filter foreign substances in the urea, and an upper cover 53 is mounted on the top of the housing 51 to cover and seal the filter 52.

In addition, the suction pipe 54 protrudes the inner-diameter portion of the housing 51 into the space inside the housing 51 so as to communicate with the space after the filtering of the filter 52. The suction pipe 54 is communicably connected to the suction port 42 of the pump 40.

Figure 10:
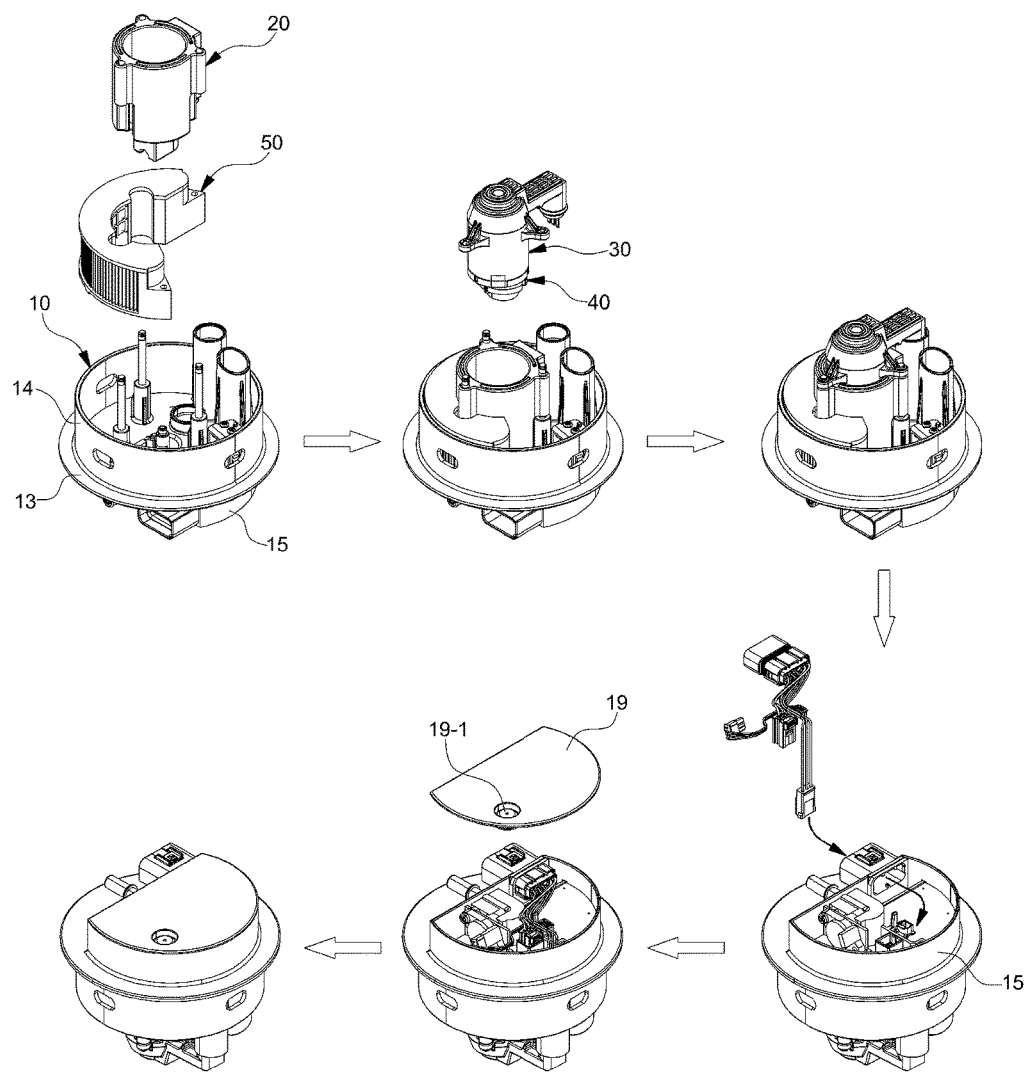
FIG. 10 is a perspective view illustrating the overall assembly process of the vehicular urea pump module according to the present disclosure.

Referring to FIG. 10, the vehicular urea pump module according to the present disclosure is completely assembled via the sequence of fastening the heater 20 so that the pipes 12 formed on the separation plate 13 are inserted into and fastened to respective first fastening holes 24 in the heater 20, mounting the filter assembly 50 in the space between the inner diameter of the upper protective plate 14 and the outer diameter of the heater 20, inserting and disposing the motor 30 and the pump 40, which have been fastened to each other, in a hollow portion of the heater 20 and inserting the tip end portions of the pipes 12, which have passed through the first fastening holes 24 in the heater 20, into respective second fastening holes 35 in the motor 30 to thereby fix the same using an E-ring, attaching, for example, various electric circuit boards, electric elements, and wires to the lower surface of the separation plate 13, and sealing the lower protective plate 15 by fusing the sealing cover 19 thereto in order to protect the electric circuit boards, the electric elements, and the wires.

Figure 17:
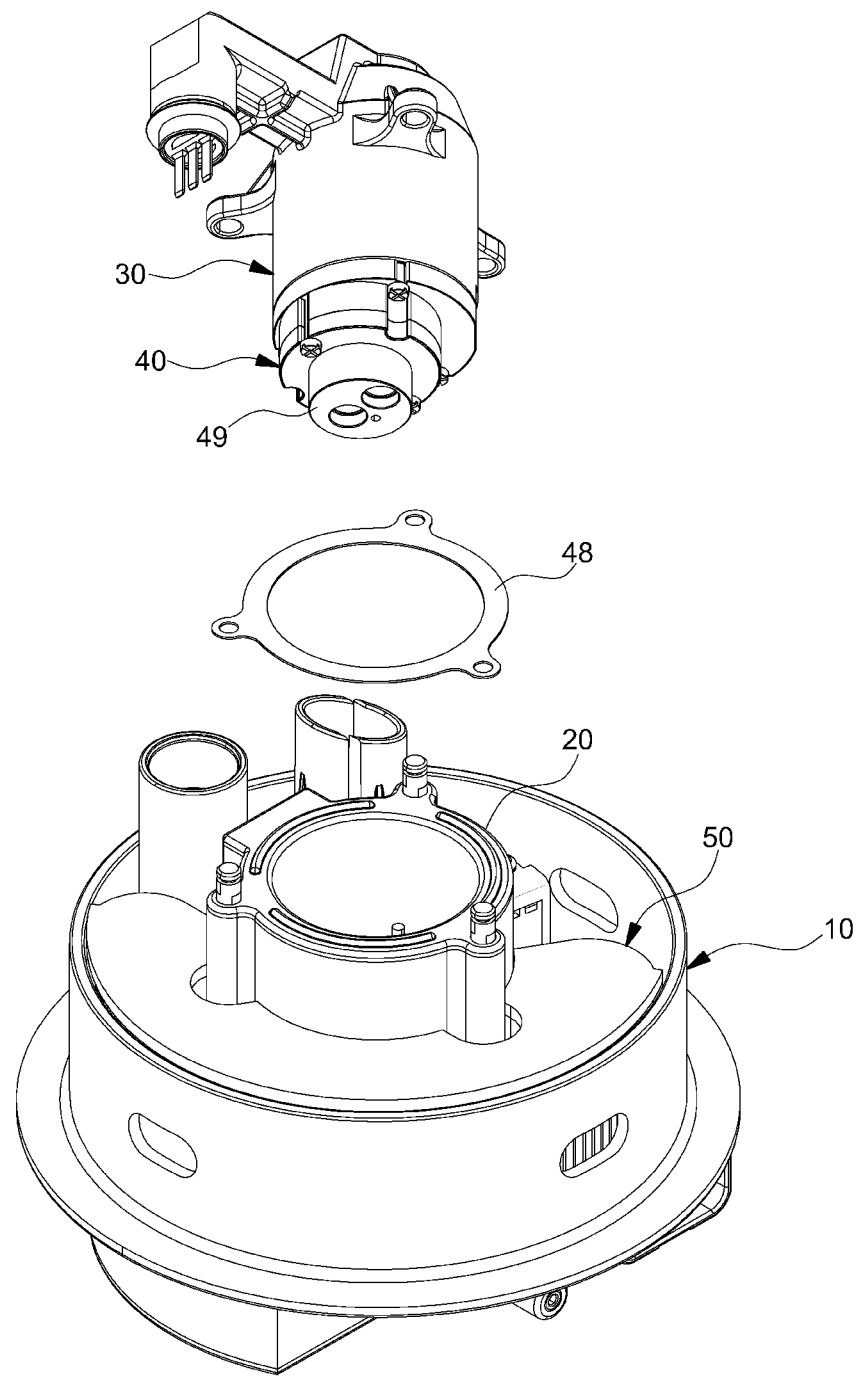
FIG. 17 is a perspective view illustrating the vibration absorption structure of the vehicular urea pump module according to the present disclosure.
Figure 18:
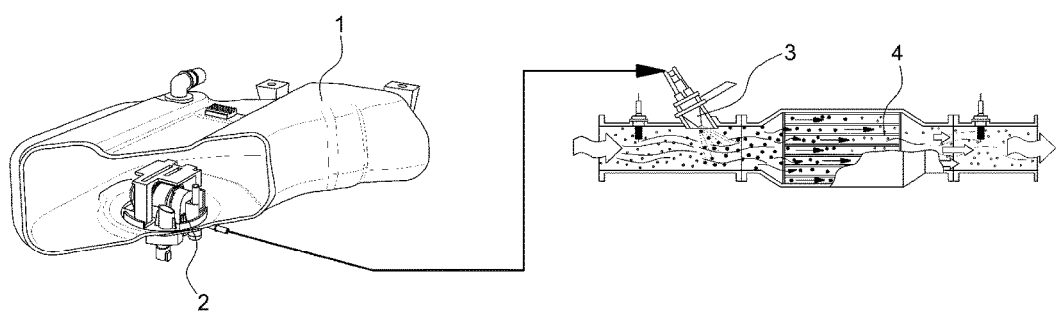
FIG. 18 (RELATED ART) is a schematic view illustrating the configuration and operation of a conventional SCR system.

When the urea pump module of the present disclosure is assembled in the above-described sequence, as illustrated in FIG. 17, a first rubber 48 having a ring shape may be attached to the lower surface of the pump 40, which is in contact with the upper surface of the separation plate 13, to absorb vibrations, and a second rubber 49 may be attached to the contact portion between the upper surface of the cylindrical heater 20 and the motor 30, which may absorb vibrations (in particular, vertical vibration) during pump driving and may attenuate noise.

In particular, although the motor, pump, heater, and the like are opened inside the urea tank when the urea pump module of the present disclosure, assembled as described above, is assembled into the urea tank, the sealing materials are molded over the surfaces of the motor, pump, heater, and the like to prevent the contact or permeation of urea, whereby water-tightness with respect to electric elements such as the heater, motor, pump, and the like may be maintained. Thereby, it is possible to easily prevent damage to the heater, motor, pump, and the like and stoppage of operation thereof.

Meanwhile, a urea capacity detection level sensor 60 and an invalid urea concentration detection sensor 70 are mounted on the upper surface of the separation plate 13 at independent positions.

Figure 15:
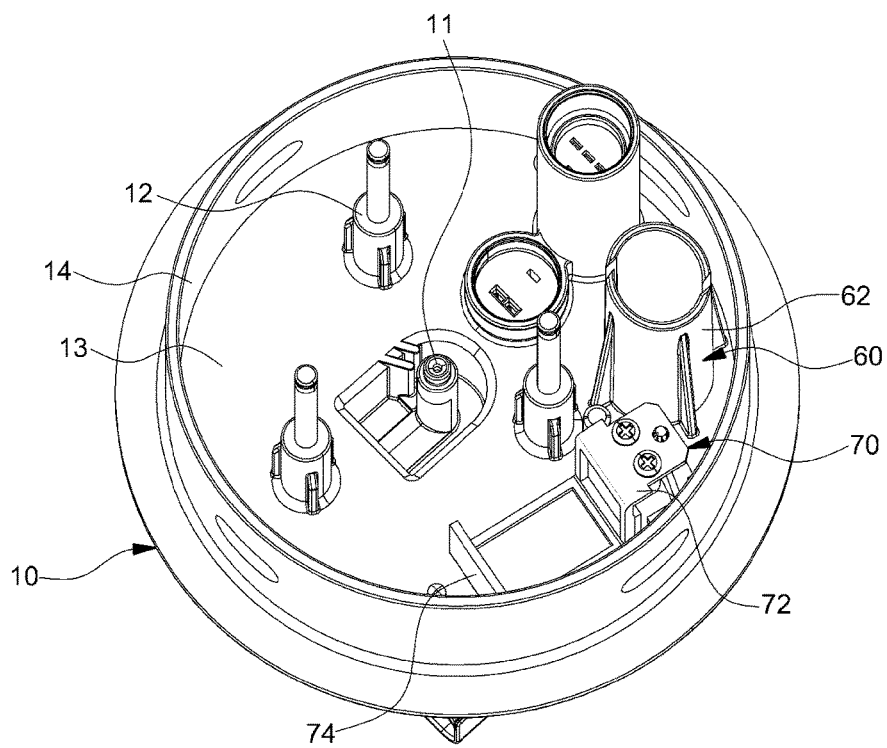
FIG. 15 is a perspective view illustrating the mounted state of various sensors of the vehicular urea pump module according to the present disclosure.

Referring to FIG. 15, the urea capacity detection level sensor 60 and the invalid urea concentration detection sensor 70 are mounted on the upper surface of the separation plate 13 at independent positions in such a manner that the urea capacity detection level sensor 60 is mounted to transmit and receive ultrasonic waves in the vertical direction and the invalid urea concentration detection sensor 70 is mounted to transmit and receive ultrasonic waves in the horizontal direction.

In addition, the urea capacity detection level sensor 60 includes a cylindrical guide 62 to guide transmission and reception of vertical ultrasonic waves, and the invalid urea concentration detection sensor 70 includes an ultrasonic wave emitter 72 and a reflector 74, which horizontally face each other on the separation plate 13.

At this time, when the urea capacity detection level sensor 60 emits ultrasonic waves upwards (toward the urea flow plane) in order to sense the capacity of urea inside the urea tank, the emitted ultrasonic waves may not be received by the urea capacity detection level sensor 60 after being reflected from the urea flow plane, but may be reflected from the urea flow plane toward other elements (i.e. toward the pump and the upper surface of the heater) and may then again be reflected toward the urea flow plane, which may deteriorate the precision of sensing.

Figure 16:
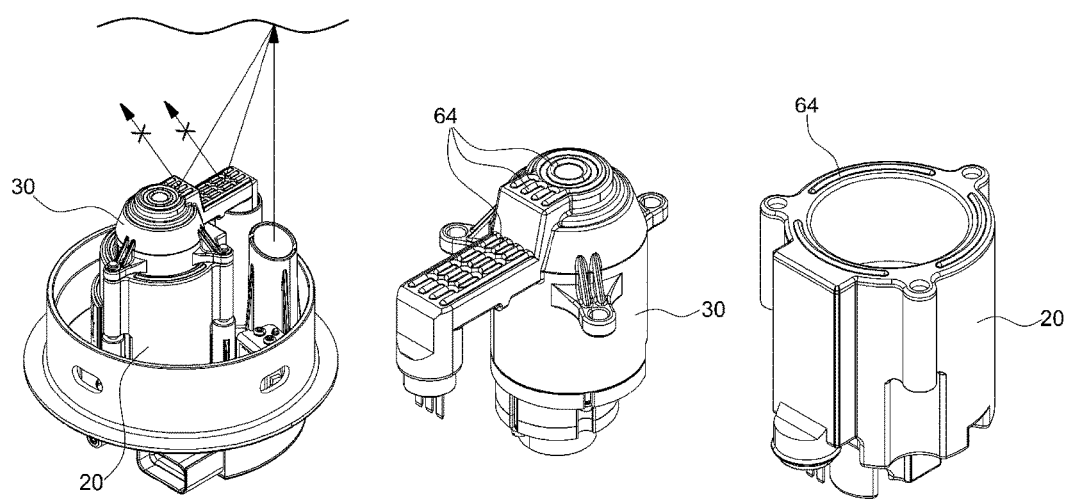
FIG. 16 is a perspective view illustrating the anti-reflection structure of a signal emitted from an ultrasonic sensor of the vehicular urea pump module according to the present disclosure.

In order to solve this, as illustrated in FIG. 16, a plurality of ribs 64 having a round cross section integrally protrudes from the upper surface of the first sealing material 23 molded on the surface of the heater 20 and the upper surface of the second sealing material 34 molded on the surface of the motor 30 in order to prevent reflection of the ultrasonic waves that have been emitted from the urea capacity detection level sensor 60 and reflected from the urea flow plane.

The operating state of the urea pump module of the present disclosure having the configuration described above will be described below.

First, when the pump 40 is driven by the driving of the motor 30, the urea inside the urea tank is suctioned into the pump 40 by the suction of the pump 40.

Figure 14:
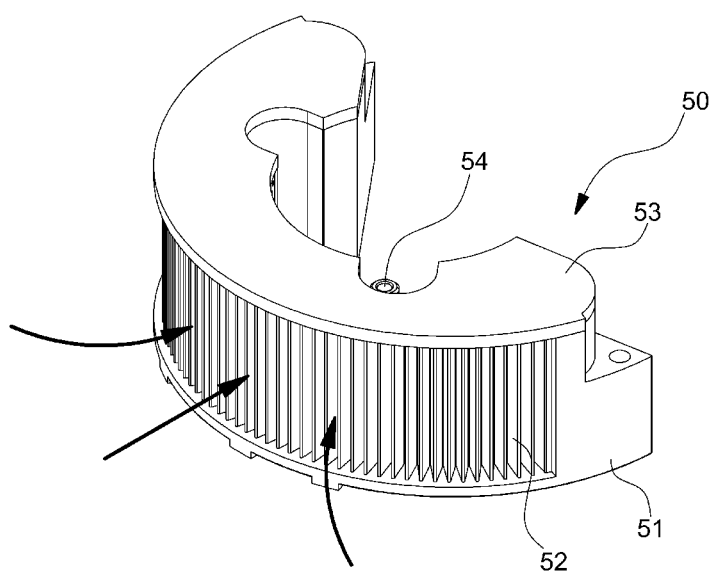
FIG. 14 is a perspective view illustrating the filtering flow of a filter in the vehicular urea pump module according to the present disclosure.

At this time, the urea inside the urea tank may pass through the filter 52 of the filter assembly 50 prior to being introduced into the pump 40. The urea is guided to flow laterally, as illustrated in FIG. 14, which may increase the efficiency of filtering of foreign substances.

That is, since the filter assembly 50 is configured to filter the urea in the lateral direction (horizontal direction), it is possible to prevent the deposition of foreign substances and, consequently, to prevent the flow of urea from being hindered thereby and to allow the foreign substances deposited due to filtering during the supply of the urea to be discharged and separated by the flow of urea during collection because of the unitary supply and collection flow path of urea.

Subsequently, the urea filtered by the filter 52 flows to the suction port 42 of the pump 40 through the suction pipe 54 of the filter assembly 50.

Next, the urea introduced into the suction port 42 of the pump 40 is discharged from the discharge port 43 of the pump 40 by pumping depending on the driving of the gears inside the pump, and thereafter is supplied to the urea-dosing module through the urea discharge port 11 in the case 10, which is connected to the discharge port 43, and through the urea supply port 18. Thereby, the urea dosing module sprays the urea to the SCR catalyst.

Figure 13:
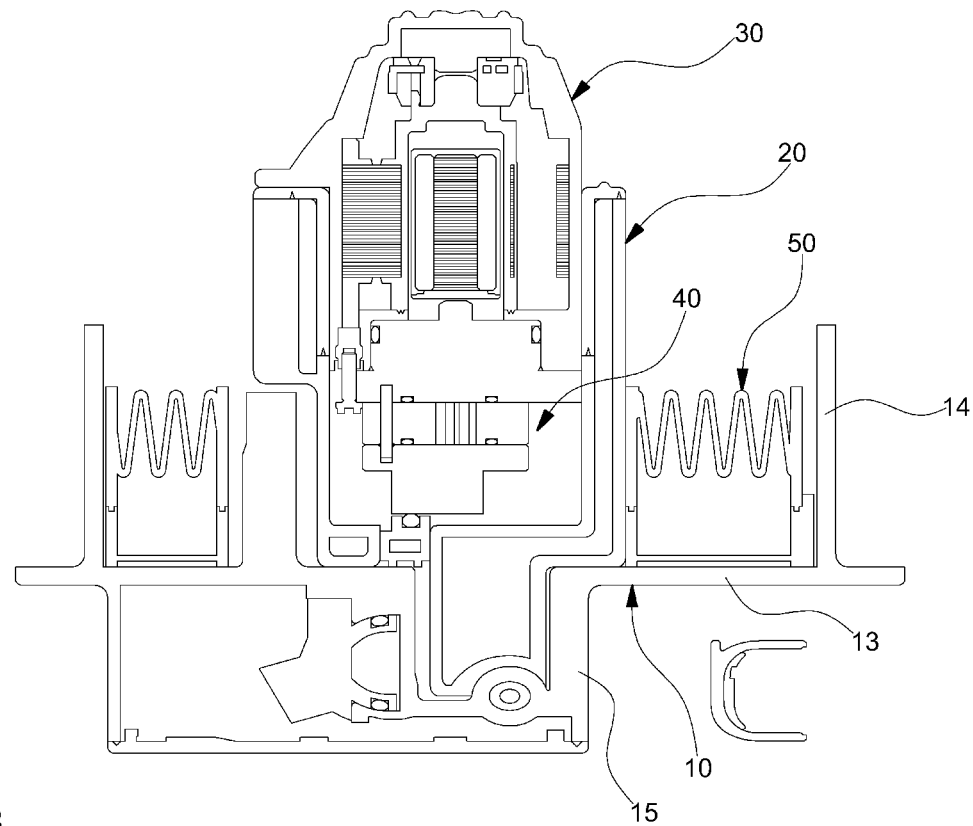
FIG. 13 is a cross-sectional view illustrating the heater assembly state of the vehicular urea pump module according to the present disclosure.

Meanwhile, when the urea is frozen in winter, as illustrated in FIG. 13, in the state in which the motor and the pump are inserted into and disposed in the hollow portion of the heater 20, the heat of the heater 20 may be transferred to the motor 30 and the pump 40 as well as the urea inside the urea tank, whereby the urea inside the pump 40 and the urea inside the urea tank may be efficiently defrosted.

As is apparent from the above description, the present disclosure provides the following effects.

(1) Although a motor, pump, heater, and the like are opened inside a urea tank when a urea pump module of the present disclosure is assembled into the urea tank, since a sealing material is molded over the surface of the motor, pump, heater, and the like to prevent the contact or permeation of urea, it is possible to easily prevent damage to the heater, motor, pump, and the like and stoppage of operation thereof.

(2) Since the heater has a cylindrical shape and is disposed between the pump and a filter, the heat of the heater may be transferred to the motor and the pump as well as the urea inside the urea tank, whereby the performance of defrosting of the urea may be maximized in winter.

(3) Since a bypass line is formed to maintain a constant pressure inside the pump, it is possible to prevent pulsation of the pump and to achieve consistent discharge and suction of the pump.

(4) Since a filter assembly has an improved structure capable of filtering the urea in the lateral direction (horizontal direction), it is possible to prevent the deposition of foreign substances and, consequently, to prevent the flow of urea from being hindered thereby and to allow the foreign substances deposited due to filtering during the supply of the urea to be discharged and separated by the flow of urea during collection because of the unitary supply and collection flow path of urea.

(5) Since a urea capacity detection level sensor and an invalid urea concentration detection sensor, which use ultrasonic waves, are assembled at independent positions, the precision of output of each sensor may be increased.

(6) Since a rubber or the like is mounted on the contact portions between the pump and the case and between the pump and the heater to absorb vertical vibration, it is possible to reduce vibration noise.

(7) Since pipes are insert-injection molded into the case when the plastic case is manufactured, the pump, heater, and the like may be easily assembled in sequence using the pipes.

(8) With only one gear-type pump, it is possible to achieve the discharge (supply) and suction (collection) of urea through forward and reverse rotation thereof.

The disclosure has been described in detail with reference to preferred embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure.

In addition, in the description of the embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intensions of users or operators, customs, or the like. Hence, the meanings of these terms should be based on the whole content of this specification. Accordingly, the above detailed description of the present disclosure is not intended to limit the present disclosure by the disclosed embodiments, and the accompanying claims should be construed as including other embodiments.

What is claimed is:

1. A vehicular urea pump module, comprising:
a case including a separation plate having a urea discharge port and a plurality of pipes formed in an upper surface thereof, and upper and lower protective plates integrally formed on upper and lower surface rims of the separation plate respectively;
a cylindrical heater including a first sealing material molded over a surface of a cylindrical heat sink coupled with a positive temperature coefficient (PTC) element, the heater having a first fastening hole formed in an outer-diameter portion thereof, into which each pipe is inserted and fastened;
a motor including a second sealing material molded over a surface of a hollow stator having a coil wound around an outer-diameter portion thereof and a terminal assembled to a top thereof, the motor having a second fastening hole formed in the outer-diameter portion so that a tip end portion of the pipe, which has passed through the first fastening hole, is inserted into and fastened to the second fastening hole; and
a pump including a rotor rotatably mounted on a top thereof so as to be inserted into the hollow stator of the motor, a suction port and a discharge port formed in a bottom portion thereof, and a pair of gears rotatably mounted therein so as to rotate forwards or in reverse,
wherein, in a state in which the motor and the pump are inserted and disposed in a hollow portion of the heater, heat of the heater is transferred to the motor and the pump and also transferred to urea inside a urea tank.

2. The module of claim 1, wherein the separation plate of the case has a lower surface to which a circuit board is attached to process signals from a urea capacity detection level sensor and an invalid urea concentration detection sensor, and the lower protective plate has a connector for input/output of the circuit board and a urea support port communicating with the urea discharge port.

3. The module of claim 1, wherein the lower protective plate is fused to a sealing cover that seals electronic elements on a lower surface of the separation plate and inside the lower protective plate, and the sealing cover has a check-valve-type air vent formed therein.

4. The module of claim 1, wherein the first sealing material includes a first molding portion primarily over-molded on a portion of an inner-diameter surface and an outer-diameter surface of the cylindrical heat sink coupled with the PTC element and a second molding portion secondarily over-molded on an upper surface and a remaining inner-diameter surface of the heat sink, and the first molding portion and the second molding portion have therebetween a contact surface provided with a serration structure.

5. The module of claim 1, wherein the second sealing material and a lower surface of the hollow stator have therebetween a contact surface provided with a serration structure.

6. The module of claim 1, wherein the pump includes a third sealing material molded over a surface of the rotor thereof, and an E-ring is fastened to an upper end of a rotating shaft exposed from an upper surface of the rotor to prevent separation of the rotor.

7. The module of claim 1, wherein the gears have a bypass line formed in a rotation center thereof so as to communicate with an inside of the urea tank, the bypass line serving as a path to remove a remaining high pressure when the gears mounted in the pump rotate forwards or in reverse.

8. The module of claim 1, further comprising a filter assembly mounted in a space between an inner diameter of the upper protective plate and an outer diameter of the heater to filter the urea introduced in a horizontal flow form through a urea inlet port formed in the upper protective plate and to guide the urea to the suction port in the pump.

9. The module of claim 8, wherein the filter assembly includes:
a housing having an outer-diameter portion that is opened so as to communicate with the urea inlet port formed in the upper protective plate, the housing being formed to have a top opening structure for filter assembly and being seated onto and assembled with a side portion of the upper surface of the separation plate;
a filter formed on a bottom of the housing via insert injection molding;
an upper cover closely assembled to a top opening in the housing to cover the filter; and
a suction pipe configured to protrude from an inner-diameter portion of the housing so as to communicate with a space inside the housing after filtering of the filter, the suction pipe being connected to the suction port in the pump.

10. The module of claim 1, further comprising a urea capacity detection level sensor and an invalid urea concentration detection sensor mounted on the upper surface of the separation plate at independent positions.

11. The module of claim 10, wherein the urea capacity detection level sensor and the invalid urea concentration detection sensor are mounted on the upper surface of the separation plate at independent positions in such a manner that the urea capacity detection level sensor is mounted to transmit and receive ultrasonic waves in a vertical direction and the invalid urea concentration detection sensor is mounted to transmit and receive ultrasonic waves in a horizontal direction.

12. The module of claim 11, wherein the urea capacity detection level sensor includes a cylindrical guide configured to guide transmission and reception of vertical ultrasonic waves, and the invalid urea concentration detection sensor includes an ultrasonic wave emitter and a reflector, which horizontally face each other on the separation plate.

13. The module of claim 1, wherein the first sealing material molded on a surface of the heater and the second sealing material molded on a surface of the motor include a plurality of ribs, having a round cross section, formed on upper surfaces thereof to prevent reflection of the ultrasonic waves that have been emitted from the urea capacity detection level sensor and reflected from a urea flow plane.

14. The module of claim 1, wherein the pump includes a first rubber having a ring shape and attached to a lower surface thereof, which is in contact with the upper surface of the separation plate, to absorb vibrations, and a second rubber is attached to a contact portion between an upper surface of the cylindrical heater and the motor upon assembly thereof.

* * * * *